(12) United States Patent
Kiffe et al.

(10) Patent No.: US 11,699,013 B2
(45) Date of Patent: Jul. 11, 2023

(54) COMPUTER-IMPLEMENTED METHOD FOR SIMULATION OF AN ELECTRICAL CIRCUIT

(71) Applicant: dSPACE digital signal processing and control engineering GmbH, Paderborn (DE)

(72) Inventors: Axel Kiffe, Loehne (DE); Katrin Witting, Borchen (DE); Frank Puschmann, Bad Driburg (DE)

(73) Assignee: DSPACE GMBH, Paderborn (DE)

( * ) Notice: Subject to any disclaimer, the term of this patent is extended or adjusted under 35 U.S.C. 154(b) by 1240 days.

(21) Appl. No.: 16/012,971

(22) Filed: Jun. 20, 2018

(65) Prior Publication Data
US 2018/0365361 A1    Dec. 20, 2018

(30) Foreign Application Priority Data

Jun. 20, 2017    (DE) .......................... 102017113594.4

(51) Int. Cl.
| | | |
|---|---|---|
| *G06F 30/367* | (2020.01) | |
| *G05B 13/04* | (2006.01) | |
| *G05B 17/02* | (2006.01) | |
| *G06F 30/20* | (2020.01) | |
| *G06F 111/10* | (2020.01) | |

(52) U.S. Cl.
CPC .......... *G06F 30/367* (2020.01); *G05B 13/04* (2013.01); *G05B 17/02* (2013.01); *G06F 30/20* (2020.01); *G06F 2111/10* (2020.01)

(58) Field of Classification Search
CPC .... G06F 30/367; G06F 30/20; G06F 2111/10; G06F 2119/06; G06F 30/30; G05B 13/04; G05B 17/02
See application file for complete search history.

(56) References Cited

U.S. PATENT DOCUMENTS

| | | | | |
|---|---|---|---|---|
| 2002/0183990 | A1* | 12/2002 | Wasynczuk ........... | G06F 30/367 703/2 |
| 2008/0072182 | A1* | 3/2008 | He .......................... | G06F 30/39 716/113 |
| 2012/0078605 | A1* | 3/2012 | Rahmat ................. | G06F 30/367 703/14 |

OTHER PUBLICATIONS

Dufour, Christian, Jean Mahseredjian, and Jean Bélanger. "A combined state-space nodal method for the simulation of power system transients." IEEE Transactions on Power Delivery 26, No. 2 (2010): 928-935 (Year: 2010).*

(Continued)

*Primary Examiner* — Eunhee Kim
(74) *Attorney, Agent, or Firm* — Leydig, Voit & Mayer, Ltd.

(57) ABSTRACT

A computer-implemented method for simulation of an electrical circuit with circuit components by at least one computing unit includes mapping a coupling of the substate representations in a coupling equation system for exchange of calculated coupling variables between the subcircuits. The method also includes calculating, in an evaluation step, at least one stability parameter on a basis of the coupling equation system, and deciding, in a selection step and depending on the at least one calculated stability parameter, whether the current separation of the electrical circuit into subcircuits will be used as the basis of the simulation. The method further includes performing, after a successful selection, the simulation of the electrical circuit by calculating the substate space representations on the at least one computing unit.

15 Claims, 10 Drawing Sheets

(56) References Cited

OTHER PUBLICATIONS

Marin, M., A. Benigni, H. Lakhdar, A. Monti, and P. J. Collins. "Towards the implementation of a parallel real-time simulator for DSP cluster." In Proc. Summer Simulation Multi-Conf.-Grand Challenges Model. Simulation (GCMS). 2012. pp. 63-69 (Year: 2012).*

Nyström, Kaj, and Peter Fritzson. "Parallel simulation with transmission lines in Modelica." In Proceedings of the 5th International Modelica Conference, vol. 1, pp. 325-331. 2006 (Year: 2006).*

Tsuji, Takao, Frédéric Magoulès, Kenko Uchida, and Tsutomu Oyama. "A partitioning technique for a waveform relaxation method using eigenvectors in the transient stability analysis of power systems." IEEE Transactions on Power Systems 30, No. 6 (2014): 2867-2879 (Year: 2014).*

Benigni, Andrea, Antonello Monti, and Roger A. Dougal. "Latency-based approach to the simulation of large power electronics systems." IEEE transactions on power electronics 29, No. 6 (2013): 3201-3213 (Year: 2013).*

Kiffe, Axel, Katrin Witting, and Frank Puschmann. "Systematic separation of electrical power systems for hardware-in-the-loop simulation." In 2017 19th European Conference on Power Electronics and Applications (EPE'17 ECCE Europe ), pp. 1-10. IEEE, 2017 (Year: 2017).*

Razzaghi, Reza, Chrysa Foti, Mario Paolone, and Farhad Rachidi. "A method for the assessment of the optimal parameter of discrete-time switch model." Electric power systems research 115 (2014): 80-86 (Year: 2014).*

Benigni, Andrea, and Antonello Monti. "A parallel approach to real-time simulation of power electronics systems." IEEE Transactions on Power Electronics 30, No. 9 (2014): 5192-5206 (Year: 2014).*

Kecman, Vojislav, S. Bingulac, and Zoran Gajic. "Eigenvector approach for order-reduction of singularly perturbed linear-quadratic optimal control problems." Automatica 35, No. 1 (1999): 151-158 (Year: 1999).*

Y. Chen and V. Dinavahi, "Hardware Emulation Building Blocks for Real-Time Simulation of Large-Scale Power Grids," in IEEE Transactions on Industrial Informatics, vol. 10, No. 1, pp. 373-381, Feb. 2014, doi: 10.1109/TII.2013.2243742 (Year: 2014).*

M. Matar and R. Iravani, "Massively Parallel Implementation of AC Machine Models for FPGA-Based Real-Time Simulation of Electromagnetic Transients," in IEEE Transactions on Power Delivery, vol. 26, No. 2, pp. 830-840, Apr. 2011, doi: 10.1109/TPWRD.2010.2086499 (Year: 2011).*

Andrea Benigni, et al., "Latency-Based Approach to the Simulation of Large Power Electronics Systems", IEEE Transactions on Power Electronics, vol. 29, No. 6, Jun. 2014, pp. 3201-3213.

Roger Champagne, et al., "Analysis and Validation of a Real-Time AC Drive Simulator", IEEE Transactions on Power Electronics, vol. 19, No. 2, Mar. 2004, pp. 336-345.

Christian Dufour, et al., "Custom-Coded Models in the State Space Nodal Solver of ARTEMiS", International Conferences on Power Systems Transients (IPST-2013), Jul. 18-20, 2013, pp. 1-6.

Tarek Ould-Bachir, "A Network Tearing Technique for FPGA-Based Real-Time Simulation of Power Converters", IEEE Transactions on Industrial Electronics, vol. 62, No. 6, Jun. 2015, pp. 3409-3418.

* cited by examiner

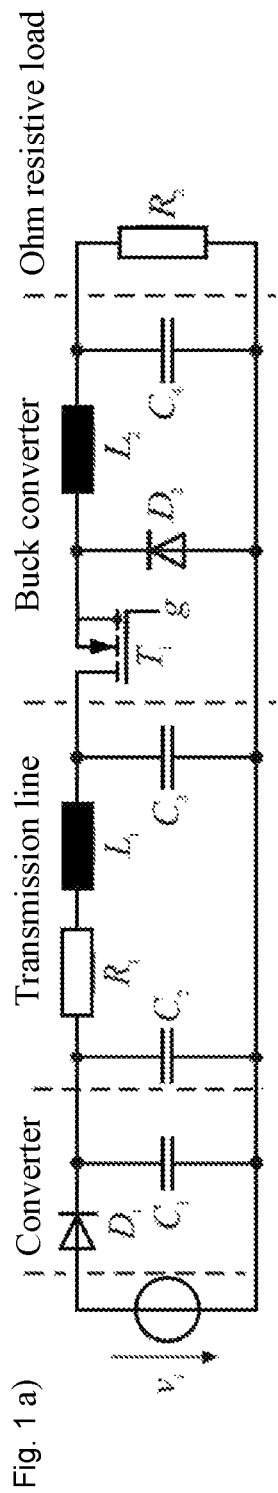
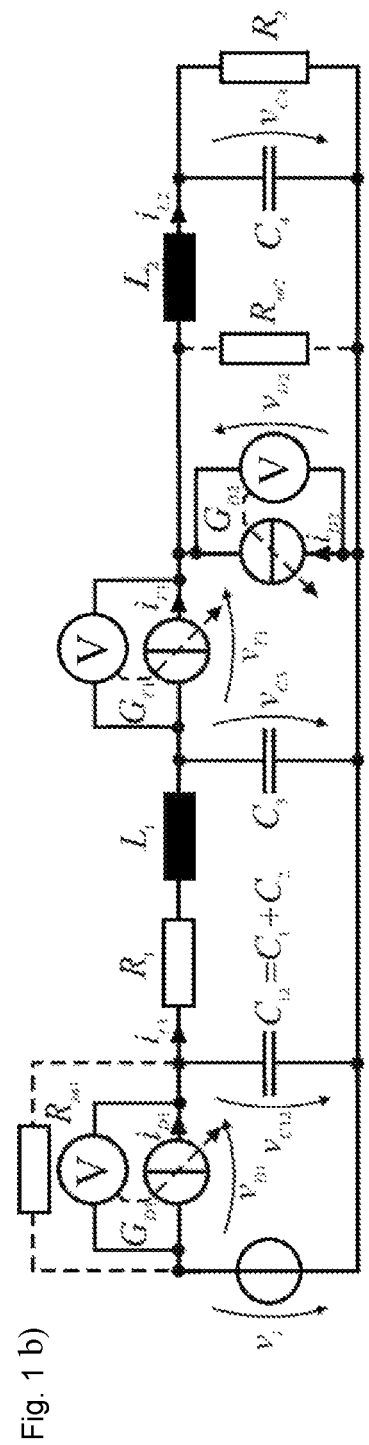
Fig. 1 a)
Fig. 1 b)

Fig. 2 b) Diode: On: $V_f > 0$ Off: $V_f \leq 0$
MOSFET: On: g=1 Off: g=0

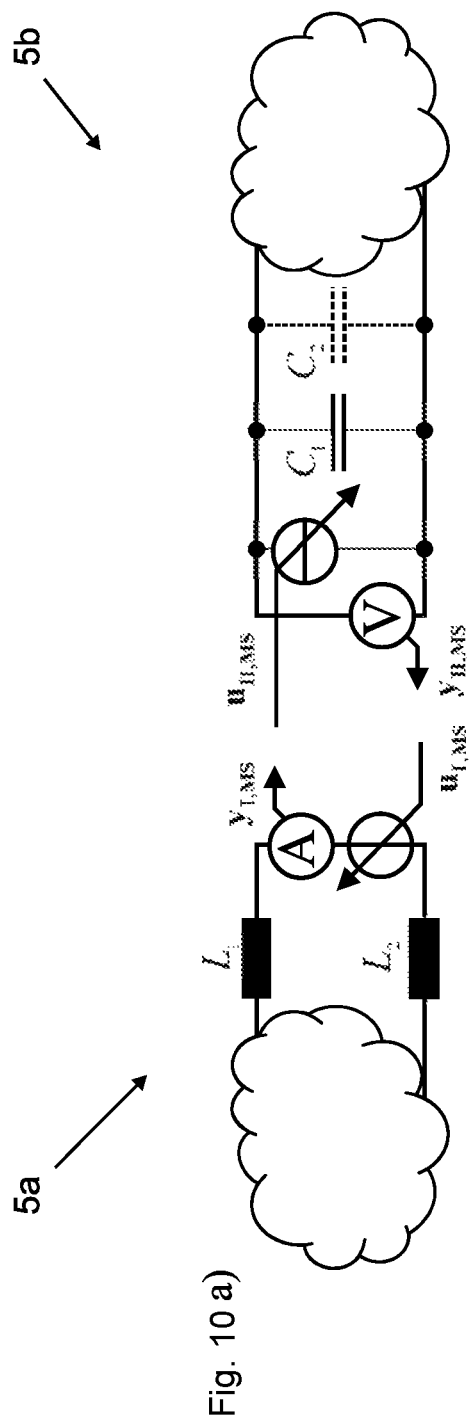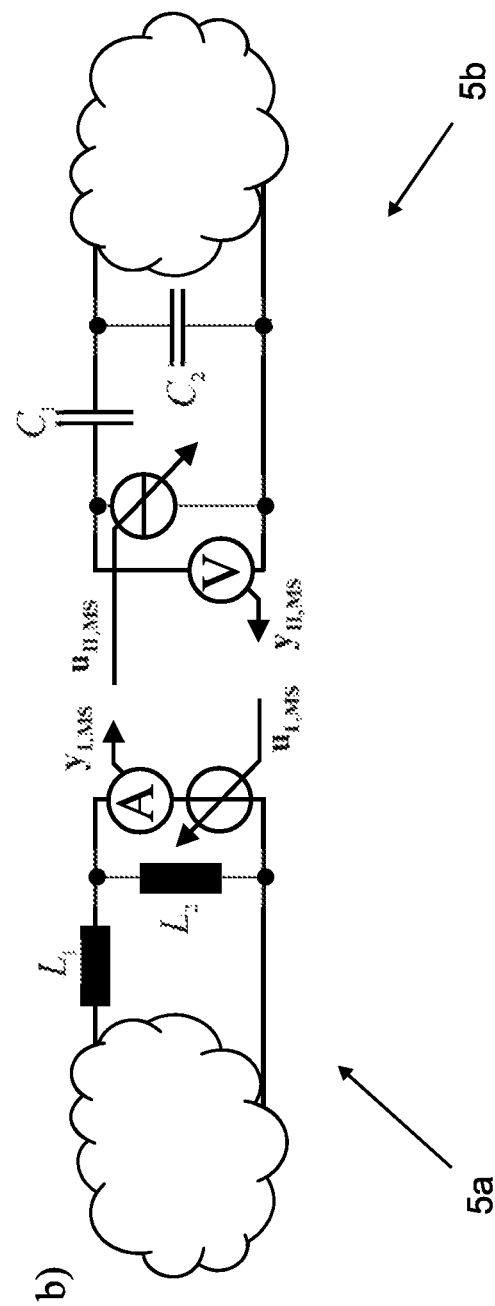
Fig. 10 a)
Fig. 10 b)

COMPUTER-IMPLEMENTED METHOD FOR SIMULATION OF AN ELECTRICAL CIRCUIT

CROSS REFERENCE TO RELATED APPLICATIONS

This application claims benefit to German Patent Application No. DE 10 2017 113 594.4, filed Jun. 20, 2017, which is hereby incorporated by reference herein.

FIELD

The invention relates to computer-implemented methods for simulation of electrical circuits by at least one computing unit. The invention pertains to the technical area of real-time simulation of electrical circuits for the purpose of influencing or testing a technical-physical process.

BACKGROUND

In electronic power applications involving for example electric drives, electric generators, or electric power grids, the electrical circuit typically comprises not only ohmic resistances, capacities and coils, but also a plurality of (semiconductor) switches, for example in final power output stages to realize an inverter. In that case, converted control data can be generated in the overall circuit that is used to properly control the circuit breakers of the inverter, whereby they are generally realized as semiconductor switching elements (e.g., MOSFET, metal oxide semiconductor field effect transistor). These circuit breakers are actively switchable and/or lockable by means of a gate. Other circuit elements in electrical power circuits are diodes, which are used for example antiparallel to circuit breakers and through which the flows that are driven by inductors when the circuit breakers are open can be released. These free-wheeling diodes, as well as other diodes, of course, are not actively switchable or lockable by means of a gate; rather, their state depends on their electrical companion dimensions, i.e., their terminal voltage or the internal diode current.

The simulation of these types of circuits, in particular electronic power circuits, places high demands on the simulation hardware used, i.e., the computing units used and their memories, in particular and also because the simulation must generally take place in real time, because a real process is impacted, and/or values measured and obtained from a real process are processed during the simulation. It is therefore important to regularly ensure that computing time and memory requirements are met.

One possibility to address this issue is to separate the overall circuit in the separation step mentioned above into at least two subcircuits by separating branch circuits. It is evident that the mathematical description of each individual subcircuit is ultimately less complex than the mathematical description of the electrical circuit as a whole. The mathematical description of these types of systems is generally performed within the context of a state-space representation, whereby the state values here are capacity voltages and coil currents in the branch circuits of the overall circuit and/or the electrical subcircuits.

Obviously, the subcircuits obtained by means of the separation step cannot be considered and calculated completely independent from each other. Rather, the subcircuits are coupled with one another at the separation points by corresponding coupling variables of the separated branch circuits, whereby each subcircuit comprises these coupling values as input and output values or respectively as output and input values. The separation of the electrical circuit into two or more subcircuits makes it possible to use, for example, a number of computing units, whereby the electrical subcircuits or, respectively, their corresponding sub state-space representations are calculated on the different computing units, making a greater computing capacity usable.

The computing units may be several processor cores, but also several processors of a multiprocessor system, which is quite frequently the case in larger HIL simulators. It is also possible that a computing unit or several computing units, respectively, is/are realized on the basis of one (or more) FPGA (field programmable gate arrays), which has speed benefits but also creates difficulties with regard to certain numerical operations such as divisions.

The separation of the overall circuit into subcircuits and the corresponding separation of the total state space representations into several substate space representations is, however, not only advantageous when using several computing units, but it may also be advantageous when only a single computing unit is used. If a circuit contains, for example, n switches, then the overall circuit will have a total of $2^n$ switching states. These states of the overall circuit are each represented mathematically in the state space circuits by a corresponding number of different matrices of the state space representation, which receive at the corresponding positions in the conduction case of a switch a corresponding electrical conductance value, and in the case of the locked state of the switch, a much lower conductance value or even the conductance value of 0. If switch positions are mathematically modeled, a corresponding number of matrices result for the different state space representation with a correspondingly high memory requirement. If divided into two subcircuits, the number of circuit combinations is reduced to $2^{n_1}+2^{n_2}<2^n (n=n_1+n_2)$, which explains the advantageous effect even when using just one computing unit.

It must be taken into consideration, however, that not every separation of an electrical circuit into several subcircuits is equally suited, because the separation impacts the stability and precision of the simulation, i.e., the calculation of the subcircuits on the at least one computing unit. If the overall circuit is separated unfavorably, it may be found that the calculation of the substate space representations corresponding to the subcircuits is not possible under the ancillary conditions, such as the temporal numerical calculation step size. It takes experience and expert know-how to be able to find an advantageous separation of the overall circuit in subcircuits.

In the prior art, the separation of the overall circuit into subcircuits is performed manually, i.e., for example through a graphically computer-guided, but by the user only manually performed, identification of the section points in the graphically represented overall circuit (dSPACE GmbH: "Manual of the Electrical Power Systems Simulation Package," September 2016, or Opal-RT: "ARTEMiS User Guide," Version 6.1, 2008). The user selects the section points only in accordance with his experience. To find out whether the hereby received separation of the overall circuit into subcircuits is numerically stable, a simulation is then generally performed on the basis of the separation and the stability determined by means of the simulation result; i.e., it is observed whether certain state values have values that could never actually be reached. This approach is extremely time consuming, requires significant expertise, and does not necessarily lead to stable simulations, because in the test run of the simulation performed to assess stability certain switching states may not even have been achieved or because the test run was not long enough to disclose instable behavior, because errors did not sufficiently accumulate during the simulation time to make an instability clearly noticeable.

SUMMARY

In an embodiment, the present invention provides a computer-implemented method for simulation of an electrical circuit with circuit components by at least one computing unit. The electrical circuit is mathematically described by an overall state space representation. The electrical circuit is separated into at least two subcircuits in a separation step that includes the separation of branch circuits. Each subcircuit is mathematically described by a substate space representation. The substate space representations are coupled with one another through coupling variables of the separated branch circuits, and each subcircuit is calculated by numerically solving coupled substate space representations on the at least one computing unit. The method includes mapping a coupling of the substate representations in a coupling equation system for exchange of calculated coupling variables between the subcircuits; calculating, in an evaluation step, at least one stability parameter on a basis of the coupling equation system; deciding, in a selection step and depending on the at least one calculated stability parameter, whether the current separation of the electrical circuit into subcircuits will be used as the basis of the simulation, and performing, after a successful selection, the simulation of the electrical circuit by calculating the substate space representations on the at least one computing unit.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIGS. 1a and 1b show an electrical circuit with semiconductor switching elements and the manipulating of the semiconductor switching elements to arrive at a state space representation;

FIGS. 10a and 10b show subcircuits with separation points that lead to substate space representations without direct punch-through of the coupling variables.

DETAILED DESCRIPTION

Figure 2:
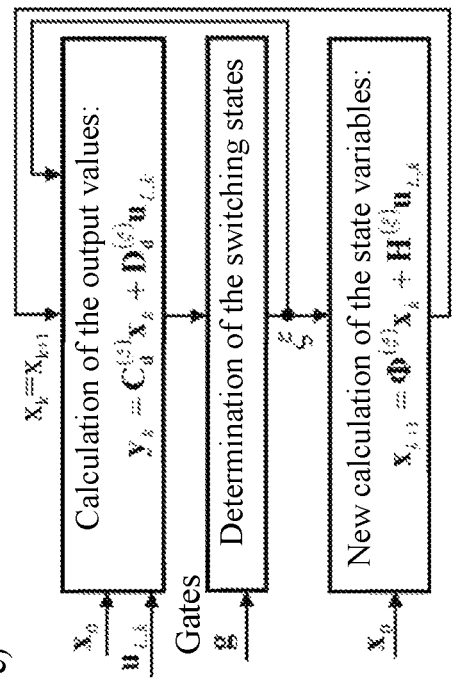
FIGS. 2a and 2b show the state space description of the overall circuit from as well as the calculation of the overall circuit on the basis of the overall state space representation.
Figure 2:
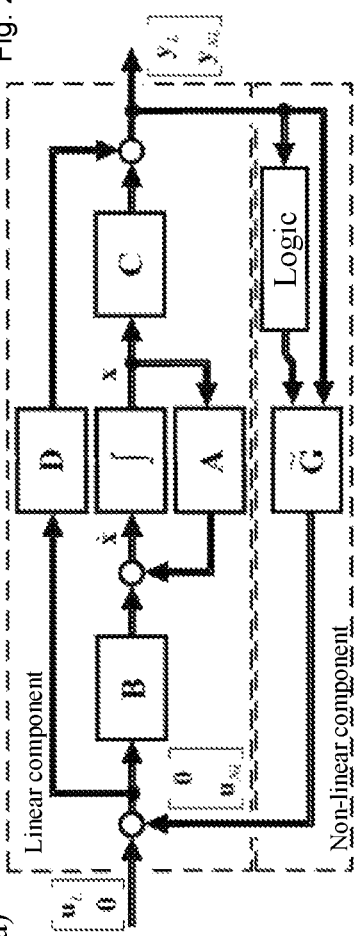

Embodiments of the invention improve methods for simulation of an electrical overall circuit in such a way that systematically stable separations of the overall circuit are determined in subcircuits in order to automatically arrive at a stable and optimized simulation of the functionality of the electrical overall circuit on the basis of the subcircuits.

According to embodiments of the invention, coupling of substate space representations is mapped in a coupling equation system for exchange of the calculated coupling variables between the subcircuits, so that at least one stability parameter is calculated in an evaluation step on the basis of the coupling equation system, so that it is decided in a selection step depending on the stability parameter whether the given separation of the overall circuit into subcircuits of the simulation is used as the basis and that, upon a successful selection, the simulation of the electrical circuit is performed by calculating the substate space representations on the at least one computing unit.

Embodiments of the invention provide computer-implemented methods for simulation of electrical circuits with circuit components by at least one computing unit, whereby the electrical circuit is mathematically described by an overall state space representation, with the overall circuit being separated into two subcircuits in a separation step that consists of the separation of branch circuits, whereby each subcircuit is mathematically described by a substate space representation, whereby the substate space representations are coupled with each through coupling variables of the separated branch circuits and each subcircuit is calculated by numerically solving the coupled substate space representations on the at least one computing unit.

Embodiments of the invention provide for real-time simulation of electrical circuits for the purpose of influencing or testing a technical-physical process. The technical-physical process may be, for example, an electric motor, a power grid, any kinds of controlled machine parts, in particular from the automation technology, which are controlled by the simulated electrical circuit. The technical-physical process may also involve controllers, for example, as they are found in great numbers in motor vehicles, aircraft, energy generation or energy distribution plants, etc. The first application case is often referred to with the term Rapid Control Prototyping (RCP). The second application case refers to the area of the Hardware-in-the-Loop (HIL) simulation.

A computing unit with which the simulation is performed can be part of a controller or an HIL simulator, which each comprise an I/O interface. By means of the I/O interface, electrical signals can be imported or exported, with the electrical signals being low-voltage analog or digital communication engineering signals. In the case of electronic power applications, the I/O interface can also be used to transfer considerable electrical power, for example to control electric motors. This means that selected, calculated output values of the electrical circuit are emitted as electrical signals by means of the I/O interface in such a way that they influence a technical-physical process. Additionally or alternatively, process values of the technical-physical process are recorded and imported in the form of electrical signals by means of the I/O interface and made available to the computing unit. The simulation therefore has a direct influence on the physical world.

Solutions according to embodiments of the invention differ from "trial and error" methods of the prior art, which are performed on the basis of simulations that were actually performed. Methods according to embodiments of the invention are based on substate space representations, which are coupled with each other by a coupling equation system to exchange the calculated coupling variables. In the subsequent evaluation step, at least one stability parameter is calculated for the simulation on the basis of the coupling equation system. Thus, an evaluation of the separation of the overall circuit into subcircuits is performed on the basis of systems theory. This evaluation may be of a traditional systems theory nature in the form of the determination of eigenvalues of the substate space representation obtained due to the separation, which are coupled with one another by means of the coupling equation. It may, however, be numerical considerations that are based on this mathematical representation when certain numerical methods for solving the equation system obtained from the separation of the overall circuit are considered. In addition, certain delay effects may be included in the coupling equation system, which go hand in hand with the numerical solution of the subsystems and the exchange of the couple variables. Ultimately, however, a theoretical stability consideration is performed in any case without a simulation on the basis of separated subcircuits being necessary.

The result of the stability consideration is then the basis for the decision that is made in the selection step depending on the calculated stability parameter, whether the current separation of the overall circuit into subcircuits will be used as the basis of the simulation. If the result of the evaluation step is that the separation that was performed is instable or inadequately accurate (so that relatively long amounts of time are needed until a stable result can be achieved), a separation of the overall circuit into subcircuits may also be rejected.

If the separation of the overall circuit is not rejected, however, i.e., if a successful selection is made, the simulation of the electrical circuit is performed by calculating the sub state representations that were previously evaluated numerically and in accordance with systems theory on the at least one computing unit. In contrast with methods known from prior art, a reliable selection of a certain separation of the overall circuit into subcircuits is performed here on the basis of systems theory and/or numerical consideration, so that the simulation of the functionality of the overall circuit on the basis of the subcircuits is reliable as well, and a basic stability requirement or even a requirement regarding the precision of the calculation can be guaranteed from the start. This not only has practical advantages for the user (time saved without lengthy simulations), but the quality of the simulation also becomes foreseeable due to the stability consideration of the submodels and in particular the coupling equations. Since the simulation generally has a direct impact on actual technical-physical processes, embodiments of the invention can significantly contribute to the process reliability as well.

It is then possible to determine in the selection step, depending on the calculated stability parameter, to decide whether the current separation of the overall circuit into subcircuits will be used as the basis of the simulation. Then, upon having successfully selected the separation of the overall circuit that was deemed as suitable, the simulation of the electrical circuit can be performed by calculating the substate space representations of the subcircuits on the computing unit.

A preferred embodiment provides that, in the case of the direct numerical solution of the coupling equation system, i.e., if a direct numerical method is used to solve equation systems, a numerical quality parameter is calculated as a stability parameter, whereby this numerical quality parameter comprises at least one of the following values: the condition, stability, consistency, convergence. These are basically known parameters used to assess the stability, the precision, or the speed of a direct numerical method.

In the case of the iterative numerical solution of the coupling equation system, it is provided that the eigenvalues of the coupling equation systems are determined as the stability parameters. It is provided in particular that the spectral radius of the coupling equation system is determined as a stability parameter.

Embodiments of the invention provide that, by inserting at least one dead time into the coupling equation system, the coupling equation system is transitioned from an implicit mathematical context to an explicit mathematical context between the coupling variables. What follows then are basically determination equations for the coupling variables, the value of which is thus directly derived for the current calculation step. The insertion of a dead time, for example by using the value of a coupling variable at the point k−1 instead of the value of the coupling variables at the point k, is not only a "mathematical trick," but can also be understood as a modeling step with a real physical background: If the subsystems and therefore the substate room representations are calculated on different processing units, the coupling variables must be transferred, which always takes time and is therefore a process involving dead time, which is represented hereby.

A further development is characterized in that a coupling variable is calculated in a calculation step may by extrapolating several previous values of this coupling variable in previous calculation steps (k−1, k−2, . . . ). This means that the extrapolation calculates an estimate of the value of a coupling variable at point k from the previous values of these state variables. Calculations have shown that significantly better calculation results are obtained this way compared to the mere use of the value of a state variable at point k by a previous value of this state variable. This applies in particular when the insertion of a dead time has no correspondent in the system and should be avoided.

In the aforementioned case, a further development for simulation of the electrical circuit is characterized in that a composite overall state space representation is formed from the coupling equations, expanded by the substate space representations and the dead times that were included, and that the eigenvalues of the composite overall state space representation are determined as stability parameters.

An advantageous further development of methods using additional dead times in the coupling equation relates to the evaluation of the determined eigenvalues of the composite overall state space representations. Here, the eigenvalues of the overall state space representation of the non-separated overall circuit, i.e., of the non-separated system, are determined additionally. Then, the distances to the eigenvalues of the composite overall state space representations are determined for each eigenvalue of the overall state space representation and for the calculation of a summary stability parameter, but only the minimum eigenvalue distance (and therefore the minimum amount of the eigenvalue difference) is used. This is how every eigenvalue of the non-composite overall state space representation is handled. The minimum eigenvalue distances (i.e., the amounts of the eigenvalue differences) are added up. The value obtained in this manner is a measure that indicates to what extent the eigenvalues of the separated systems have moved away from the non-separated system. The smaller the distance between the sums, the better the quality of the separation that was performed with regard to stability, if it is assumed that the non-separated overall circuit naturally constitutes a (numerically) stable solution.

A particularly advantageous variation of a method for simulation of an electrical overall circuit is characterized in that the overall circuit is separated in several separation steps into several different subcircuit variations. For each of the different subcircuit variations, at least one stability parameter is then calculated in a separate evaluation step, so that a plurality of stability parameters results. In the selection step, depending on the plurality of the calculated stability parameters, the most suitable separation of the overall circuit is selected, in particular by comparing the plurality of calculated stability parameters.

A further development addresses the problem of finding promising separation points in the overall circuit as described above. A further development that addresses that issue provides that the directly dependent state values of the overall circuit and therefore the linear dependent circuit components are determined in a detection step to detect dependent circuit components. Such dependencies exist, for example, if loops form in which only capacitors and voltage sources are located, or if nodes form to which only voltage sources and inductors are attached.

In a separation exclusion step, the branch circuits between the dependent circuit components are excluded as possible separation sites for the overall circuit, and in the next separation step, the branch circuits are excluded that were excluded in the separation exclusion step as possible separation sites for the overall circuit. By taking this step, separations of linear dependent state values are avoided and it is prevented that a separation of the overall circuit occurs where, in the mathematical sense, a stiff coupling of state variables exists.

The branch circuits determined in the separation exclusion step may be disclosed to the user, so that the user can avoid the corresponding branch circuits when manually placing separation points. In case of a fully automated separation of the overall circuit by a computer, a separation between linear dependent state values can obviously also be excluded, for example, by adding the respective comments for a separation ban in a netlist for the overall circuit.

A further development regarding the detection step provides that dependent switch groups are determined for the detection of dependent circuit components in the overall circuit, i.e., those switches that directly influence one another. This may be, for example, the connection of a MOSFET and a diode in a series. The MOSFET can be actively controlled externally; i.e., it is a forced switching status, while the diode sets its switching status depending on the switching status of the MOSFET and the then resulting connection values of the diode. These types of directly connected and dependent switching events cannot be separated from one another.

As already explained above in connection with the detection of independent circuit components, this procedural step may also be implemented additionally for a user of a method by displaying to the user the elements of detected dependent switching groups, but allowing the user itself to define potential separation points in the overall circuit. The procedural step may, however, be performed in a fully automated manner as well.

In a preferred embodiment, stability parameters are calculated for several combinations of switch settings. As explained above, each changed switch setting must lead to a changed mathematical description, i.e., a changed state space representation of the corresponding circuit; the matrix positions have changed values depending on the switch positions. This way, stability parameters are obtained for several combinations of switch settings which can be evaluated in their totality. The separation of the overall circuit that has the best stability behavior overall may then be preferred. Preferably, only the combinations of switch settings that may actually occur are considered. The switches in an inverter are, for example, only operated in a very particular way and manner on the basis of a preset circuit diagram, so that only a very limited number of switch settings of the total number of theoretically possible switch settings has to be considered at all.

Finally, a further embodiment is characterized in that the selection of the branch circuits to be separated in the separation set is performed depending on whether the resulting subsystems have approximately the same number of energy storage systems in the form of coils and capacitors and/or whether the resulting subsystems have approximately the same number of switches, in particular whereby a limit is provided for an acceptable deviation from the equal number of energy storage systems and/or switches and/or inputs and/or outputs.

In FIGS. 1 to 10 illustrate, with different focus areas, a computer-implemented method 1 for simulation of an electrical circuit 2 with circuit components (R, L, C, D, T).

The exemplary overall circuit 2 in FIG. 1a comprises from right to left a rectifier, a transmission line, a buck converter, and an ohmic load. The semiconductor switches are the diodes $D_1$, $D_2$ and the MOSFET transistor $T_1$. FIG. 1b shows the transmission of the overall circuit 2 in a suitable illustration for the formulation of the overall circuit 2 in the state space. The semiconductor switches $D_1$, $D_2$, $T_1$ are mapped here by voltage-controlled current sources with a conductance value G, $G_{D1}$, $G_{D2}$, $G_{T1}$. The conductance values G change depending on the switching state of the semiconductor switches $D_1$, $D_2$, $T_1$, so that different conductance matrices G result in the state space representation, depending on the switching state of the semiconductor switches $D_1$, $D_2$, $T_1$. The overall circuit 2 can now be described through a time-continuous overall state space representation 4 (equation 1):

$$\bar{x} = A^{(\xi)} x + B^{(\xi)} u, \; y = C^{(\xi)} x + D^{(\xi)} u$$

$$A^{(\xi)} = A + BG^{(\xi)}NC, \quad B^{(\xi)} = B + BG^{(\xi)}ND, \quad C^{(\xi)} = NC, \; D^{(\xi)} = ND, \; N = (I - D\tilde{G}^{(\xi)})^{-1}.$$

In this representation, A is the system matrix, B is the input matrix, C is the output matrix, and D is the throughput matrix, as it is known from systems theory. I is the unit matrix and G the switching state independent conductance matrix, whereby $\xi$ represents the $\xi$-th switching state. As is customary for numerical calculations, these relations can be formulated in a time-discrete overall state space representation 4 (equation 2):

$$x_{k-1} = \Phi^{(\xi)} x_k + H^{(\xi)} u_{t,k}$$

$$y_k = C_d^{d(\xi)} + D_d^{(\xi)} u_{t,k}$$

These mathematical descriptions of an overall circuit 2 with circuit components R, L, C, D, T are basically known from prior art, just as the manipulation of the (semiconductor) switching elements $D_1$, $D_2$, $T_1$.

FIG. 2a shows a block diagram representation of the overall state space representation 4 of the overall circuit 2. It can be seen that the nonlinear part of the overall state space representation 4 caused by the semiconductor switch (nonlinear part) is picked up by a corresponding switching logic (logic) as explained in FIG. 2b. FIG. 2c illustrates how the overall circuit 2 is then mathematically solved on the basis of the overall state space representation 4. The output values $y_k$ are calculated on the basis of the last calculated state variables $x_k$ and the input values $u_{L,k}$ (calculation of the output values). A switching state $\xi$ of the overall circuit 2 results on the basis of the control of the controllable semiconductor switch (gates, switch-state determination), whereby an interim iteration or even several interim iterations may occur during the determination of the switching state $\xi$ until a stationary switching state $\xi$ is found. The reason for this is that in particular passive switches, i.e., those that do not have an external control connection, such as the diodes $D_1$, $D_2$ shown in FIGS. 1 and 2, take a switching state that depends on their connection values, i.e., of their terminal voltage and of their internal current. Consequently, it may take some calculation iterations within the actual calculation step size until a switching state $\xi$ remains stationary. Finally, a new calculation of the state values $x_{k+1}$ is performed (update of the state variables).

Figure 3:
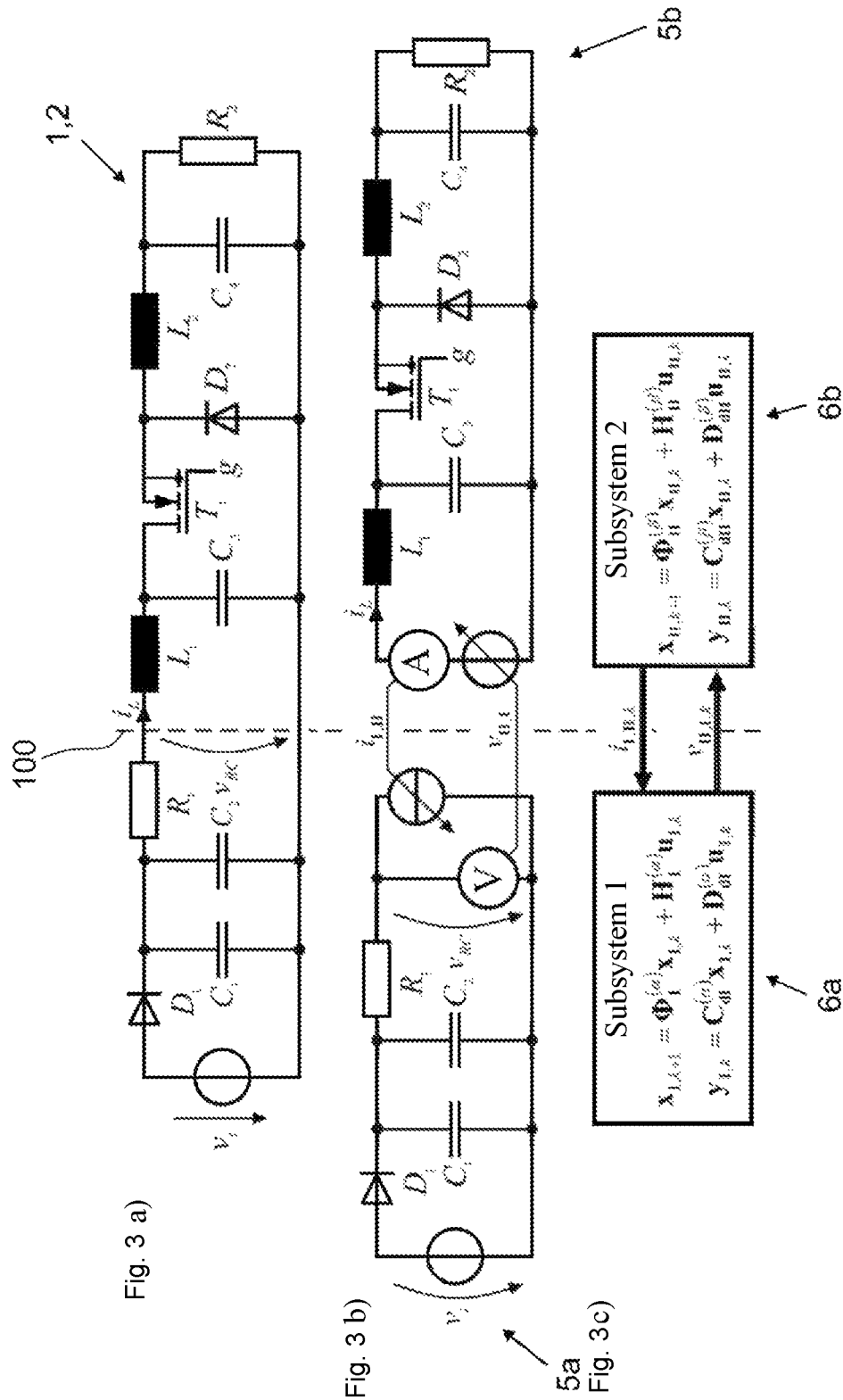
FIGS. 3a-3c show a separation of the overall circuit from FIG. 1 into two subcircuits with the corresponding substate space representations and coupling variables.

For a better understanding, FIG. 3a shows the overall circuit once again, as it was already illustrated in FIG. 1a. The vertical dotted line indicates a separation step 100, in which the electrical circuit 2 is separated into two subcircuits 5a, 5b through a separation of branch circuits. The result of the separation step 100 is illustrated in FIG. 3b. Many more subcircuits 5 may be generated in the separation step 100; to illustrate the method, the example here is limited to two subcircuits 5a, 5b. Each of the subcircuits 5a, 5b are mathematically described by a substate space representation 6a, 6b as shown in FIG. 3c. The substate space representations 6a, 6b (referred to in FIG. 3 as subsystem 1 and subsystem 2 as well) are time-discrete here again as well. Since the subcircuits 5a, 5b are not independent from one another at the separation point, i.e., at the separated branch circuits, but coupled with one another, this connection is described as a coupling equation in dependence of the coupling variables $i_{I,II,k}$ and $v_{II,I,k}$. Each of the subcircuits 5a, 5b is calculated on a computing unit 3 by the numerical solution of the coupled substate space representations 6a, 6b.

Figure 4:
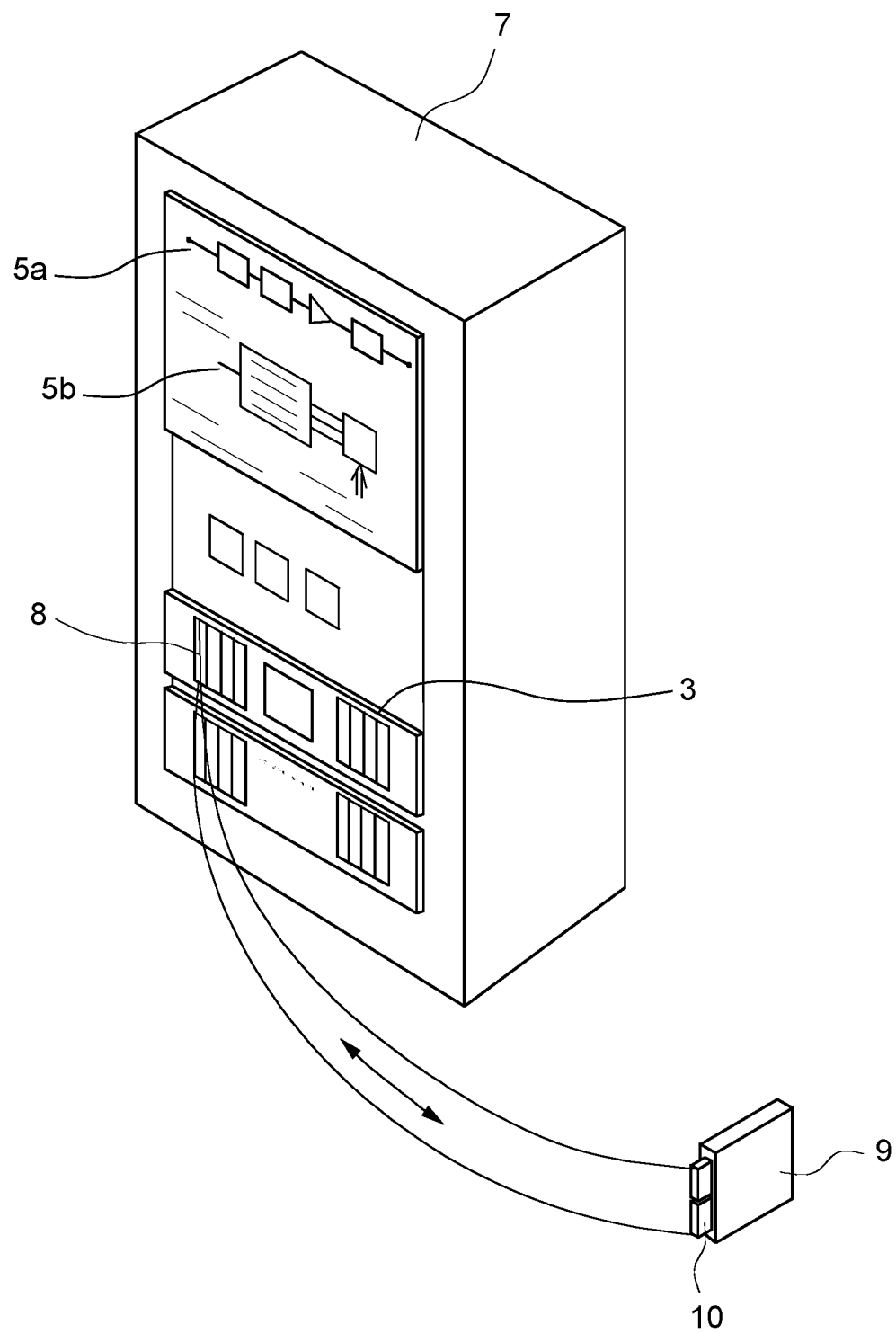
FIG. 4 shows an HIL simulator with an I/O interface and a connected control device.

FIG. 4 shows a typical environment in which a method 1 for simulation of the electrical overall circuit 2 or, respectively, the subcircuits 5a, 5b is performed. In this embodiment, method 1 is performed on a simulator 7 with several computing units 3. The method works just as well, however, with just one computing unit 3. The substate space representations 6a, 6b, which are coupled with one another through coupling variables, are numerically solved with the computing units 3 of the simulator 7. By means of I/O interfaces 8 of the simulator 7, part of the calculated values of a technical-physical process are provided in the form of a controller 9. Conversely, the reaction values of the controller 9 that are provided via the controller interface 10 are imported from the simulator 7 via its I/O interface 8 and used again as the basis of the calculation within the simulator 7. The calculation of the overall circuit 2 or the subcircuits 5a, 5b, respectively, on the computing units 3 of the simulator 7 therefore has direct consequences on the technical-physical process in the form of the controller 9. The illustrated application case is an HIL simulation, whereby the device to be tested (device under test) here is the controller 9. The calculation of the overall circuit 2 or the subcircuit 5a, 5b, respectively, on the computing units 3 is performed in real time, because the technical-physical process obviously operates in "real time" as well. It is important to ensure, therefore, that the overall circuit 2 or respectively the subcircuit 5a, 5b can or, respectively, could be calculated with the available hardware resources in real time.

As shown above, a known means for solving this task is the separation of the overall circuit 2 into several subcircuits 5a, 5b. The separation reduces the complexity (possible switching combinations), so that a real-time calculation of larger circuits becomes possible as well. The problem is that not every possible separation 100 of an overall circuit 2 into several subcircuits 5a, 5b is equally suitable, for example because under the existing ancillary conditions, such as the numerical calculation step size, a numerically stable or sufficiently fast simulation is not possible. As described above, it is customary in prior art for the determination of the stability of the calculation of several subcircuits 5a, 5b to perform the corresponding subcircuits 5a, 5b or respectively the corresponding substate space representations 6a, 6b on the computing unit 3 or on several computing units 3, so that an empirical stability value is obtained through the practical execution of the simulation. This empirical value is not, however, reliable in cases of doubt because the stability conclusions are only confirmed in a longer simulation or because the simulation that is performed does not cover all possible switching combinations.

Figure 5:
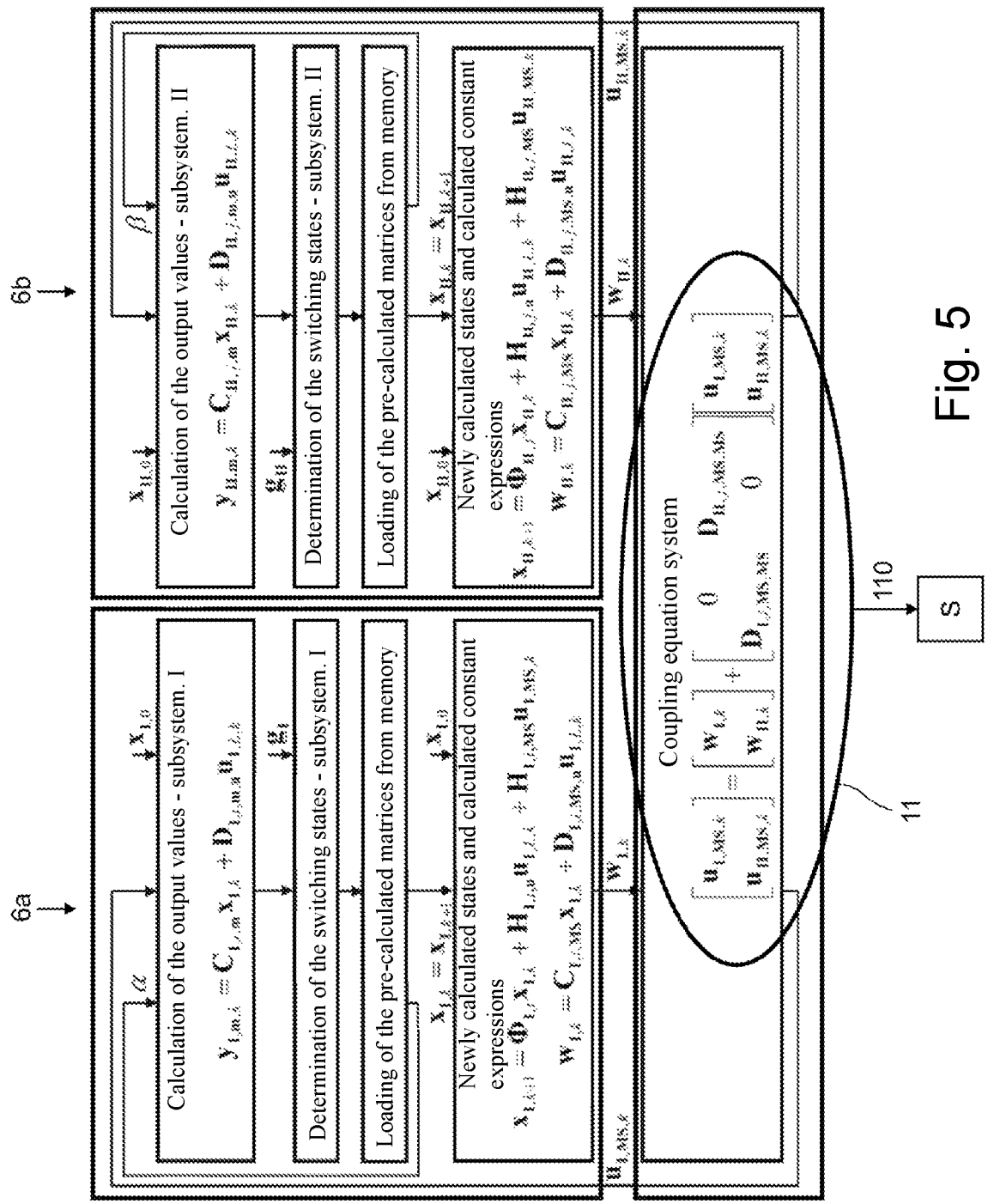
FIG. 5 shows a substate space representation with a coupling equation system and calculation of a stability parameter on the basis of the coupling equation system.

The figures of FIG. 5 show how this problem is addressed. FIG. 5 shows in the top area first of all the manipulation of the substate space representation 6a, 6b, which, in principle, corresponds to the manipulation of the overall state space representation 4, as it is shown in FIG. 2c. In a little more detail, the substate space representations 6a, 6b are as follows for the subcircuits I, 5a (equation 3)

$$x_{I,k+1} = \Phi_I^{(\alpha)} x_{I,k} + \begin{bmatrix} H_{I,u}^{(\alpha)} & H_{I,MS}^{(\alpha)} \end{bmatrix} \begin{bmatrix} u_{I,int,k} \\ u_{I,MS,k} \end{bmatrix},$$

$$\begin{bmatrix} y_{I,int,k} \\ y_{I,MS,k} \end{bmatrix} = \begin{bmatrix} C_{dI,m}^{(\alpha)} \\ C_{dI,MS}^{(\alpha)} \end{bmatrix} x_{I,k} + \begin{bmatrix} D_{dI,m,u}^{(\alpha)} & D_{dI,m,MS}^{(\alpha)} \\ D_{dI,MS,u}^{(\alpha)} & D_{dI,MS,MS}^{(\alpha)} \end{bmatrix} \begin{bmatrix} u_{I,int,k} \\ u_{I,MS,k} \end{bmatrix}$$

and for the subcircuit II, 5b (equation 4)

$$x_{II,k+1} = \Phi_{II}^{(\beta)} x_{II,k} + \begin{bmatrix} H_{II,u}^{(\beta)} & H_{II,MS}^{(\beta)} \end{bmatrix} \begin{bmatrix} u_{II,int,k} \\ u_{II,MS,k} \end{bmatrix},$$

$$\begin{bmatrix} y_{II,int,k} \\ y_{II,MS,k} \end{bmatrix} = \begin{bmatrix} C_{dII,m}^{(\beta)} \\ C_{dII,MS}^{(\beta)} \end{bmatrix} x_{I,k} + \begin{bmatrix} D_{dII,m,u}^{(\beta)} & D_{dII,m,MS}^{(\beta)} \\ D_{dII,MS,u}^{(\beta)} & D_{dII,MS,MS}^{(\beta)} \end{bmatrix} \begin{bmatrix} u_{II,int,k} \\ u_{II,MS,k} \end{bmatrix}$$

The Index I stands here for the first subcircuit 5a, and the Index II stands for the subcircuit 5b. The inputs of the subcircuits 5a, 5b or respectively their substate space representations 6a, 6b are either arbitrary inputs $u_{I,int,k}$, $u_{II,int,k}$ (typically these are sources that are independent from the separation of the overall circuit 2 within the subcircuit) or inputs $u_{I,MS,k}$, $u_{II,MS,k}$, which are associated with the separation points. In the same way, the starting vector is distributed into any number of outputs $y_{I,m,k}$; $y_{II,m,k}$, which are not associated with the separation of the overall circuit 2 and outputs $y_{I,MS,k}$; $y_{II,MS,k}$, which are associated with the separation points. The high indices α and β identify the switching states within the subcircuit 5a, 5b.

The representation in the equations 3 and 4 show as well how the equation systems are coupled at a separation point of the overall circuit 2 through the inputs and outputs because the following applies (equation 5):

$$u_{II,MS,k} = y_{I,MS,k} \text{ and } u_{I,MS,k} = y_{II,MS,k}.$$

The illustrated connection between the coupling of the two subcircuits 5a, 5b by means of the coupling values (equation 5) leads to an equation-like description of the subcircuits 5a, 5b by the following substate space representations 6a, 6b, i.e., for the subcircuit 5a (equation 6)

$$x_{I,k+1} = \Phi_I^{(\alpha)} x_{I,k} + H_{I,u}^{(\alpha)} u_{I,int,k} +$$
$$H_{I,i,MS}^{(\alpha)} u_{I,MS,k}, \quad y_{I,m,k} = C_{dI,m}^{(\alpha)} x_{I,k} +$$
$$D_{dI,m,u}^{(\alpha)} u_{I,int,k} +$$
$$D_{dI,m,MS}^{(\alpha)} u_{I,MS,k} y_{I,MS,k} = u_{II,MS,k} = C_{dI,MS}^{(\alpha)} x_{I,k} +$$
$$D_{dI,MS,u}^{(\alpha)} u_{I,int,k} + D_{dI,MS,MS}^{(\alpha)} u_{I,MS,k}$$

and for the subcircuit 5b (equation 7)

$$x_{II,k+1} = \Phi_{II}^{(\beta)} x_{II,k} + H_{II,MS}^{(\beta)} u_{II,MS,k}, \quad y_{II,m,k} =$$
$$C_{dII,m}^{(\beta)} x_{II,k} + D_{dII,m,u}^{(\beta)} u_{II,int,k} +$$
$$D_{dII,m,MS}^{(\beta)} u_{II,MS,k} y_{II,MS,k} = u_{I,MS,k} =$$
$$C_{dII,MS}^{(\beta)} x_{II,k} + D_{dII,MS,u}^{(\beta)} u_{II,int,k} +$$
$$D_{dII,MS,MS}^{(\beta)} u_{II,MS,k}$$

The relationships with the output values in the equations 6 and 7 now make it possible to derive a coupling equation system 11 (equation 8, FIG. 5):

$$\begin{bmatrix} u_{I,MS,k} \\ u_{II,MS,k} \end{bmatrix} = \begin{bmatrix} w_{II,k} \\ w_{I,k} \end{bmatrix} + \begin{bmatrix} 0 & D_{dII,MS,MS}^{(\beta)} \\ D_{dI,MS,MS}^{(\alpha)} & 0 \end{bmatrix} \begin{bmatrix} u_{I,MS,k} \\ u_{II,MS,k} \end{bmatrix}$$

$$w_{I,k} = C_{dI,MS}^{(\alpha)} x_{I,k} + D_{dI,MS,u}^{(\alpha)} u_{I,int,k} \text{ and}$$

$$w_{II,k} = C_{dII,MS}^{(\beta)} x_{II,k} + D_{dII,MS,u}^{(\beta)} u_{II,int,k}.$$

The coupling equation system 11 describes the exchange of the calculated coupling variables between the subcircuits 5a, 5b.

Then, on the basis of the coupling equation system 11, a stability parameter S is calculated in an evaluation step 110 which, based on theoretical considerations, allows for an informed evaluation of the stability of the calculation of the coupled substate space representation 6a, 6b. It is therefore not necessary to perform a simulation of the substate space representations 6a, 6b; the stability parameter S is based on systems theory and/or numerical stability criteria on the basis of the coupling equation system 11.

Figure 6:
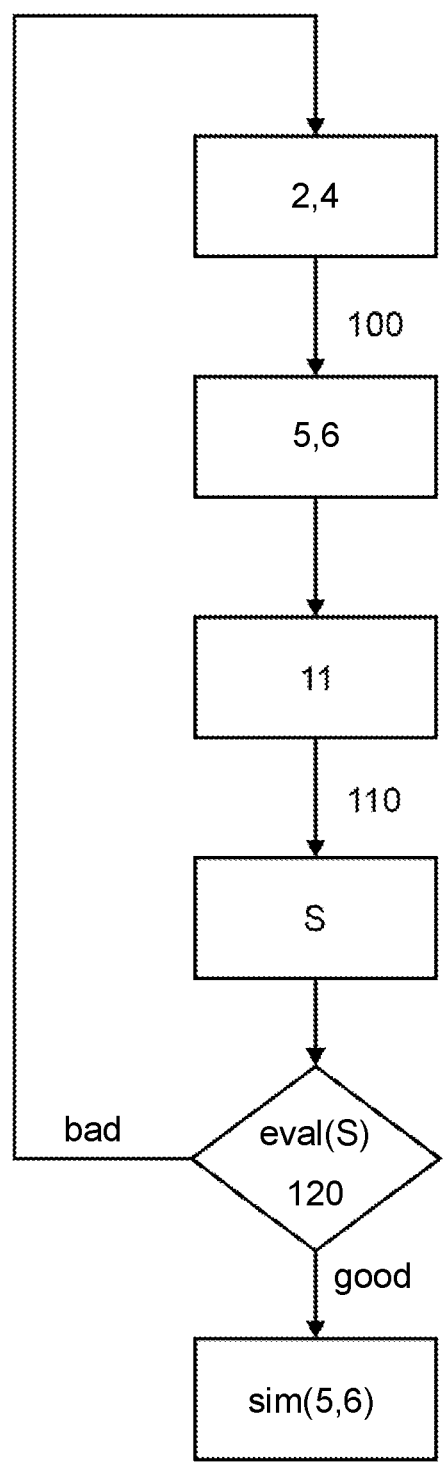
FIG. 6 shows a flow chart with separation step, evaluation step, selection step, and ultimately the simulation of the selected coupled subcircuits.

FIG. 6 represents method steps up to this point as well as other procedural steps in a diagram. The starting point is the electrical circuit 2 and its overall state space representation 4. In a separation step 100, a separation of the overall circuit 2 into subcircuits 5 is performed, which is mathematically described by substate space representations 6. First, a coupling equation system 11 is formulated which maps the coupling of the substate space representations 6. In a subsequent evaluation step 110, at least one stability parameter S is calculated on the basis of the coupling equation system 11, for example in the form of eigenvalues, the calculation of the condition number (in the case of direct numerical solutions), etc.

In a selection step 120, depending on the calculated stability parameter S, it is decided whether the current separation of the overall circuit 2 into subcircuits 5 will be used as the basis of the simulation or not. In this selection step 120, therefore, the stability parameter S itself is evaluated. Basically instable solutions cannot form the basis for another simulation if the non-separated system was stable. Even stable separations of the overall circuit, however, can be rejected in the selection step 120 if it is found, for example, that a separation would, in general, lead to stable results, but that the calculation does not sufficiently converge quickly. If a separation does not seem suitable, the general approach, i.e., to test and evaluate a different separation of the overall circuit 2 on the basis of the overall circuit 2, is illustrated in FIG. 6 by the "bad" branch in the selection step 120 after the evaluation eval(S).

If the stability parameter S passes the evaluation in the selection step, the separation that is made becomes the basis of the further simulation on a computing unit 3 (sim(5, 6)).

The calculation of the stability parameter S may vary. In the case of a numerical solution of the coupling equation system 11, for example through an application of the Gaussian method by means of an LU separation, the condition number κ is calculated as the stability parameter S of the coupling equation system 11. In doing so, the equation system (equation 9) from the coupling equation system 11 (equation 8) is solved:

$$\begin{bmatrix} I & -D_{dII,MS,MS}^{(\beta)} \\ -D_{dI,MS,MS}^{(\alpha)} & I \end{bmatrix} \begin{bmatrix} u_{I,MS,k} \\ u_{II,MS,k} \end{bmatrix} = \begin{bmatrix} w_{II,k} \\ w_{I,k} \end{bmatrix}$$

The condition number κ is a value which describes both the convergence speed and therefore the stability of the calculation as well as the precision of the calculation.

What is disadvantageous in the use of direct numerical solution methods is the circumstance that a large number of divisions have to be performed that are extremely time and resource consuming on FPGAs (Field Programmable Gate Arrays). If the simulation is performed on an FPGA basis, therefore, it would make more sense to use an iterative numerical solution method without division to manipulate the coupling equation system 11, for example through fixed-point iteration. To this purpose, the coupling equation system 11 is first formulated as a fixed-point equation, i.e., brought to the form x=f(x) as the iteration rule (equation 10):

$$\begin{bmatrix} u_{I,MS,k,p+1} \\ u_{II,MS,k,p+1} \end{bmatrix} = \begin{bmatrix} w_{II,k} \\ w_{I,k} \end{bmatrix} + \begin{bmatrix} 0 & D_{dII,MS,MS}^{(\beta)} \\ D_{dI,MS,MS}^{(\alpha)} & 0 \end{bmatrix} \begin{bmatrix} u_{I,MS,k,p} \\ u_{II,MS,k,p} \end{bmatrix},$$

$$\begin{bmatrix} u_{I,MS,k,0} \\ u_{II,MS,k,0} \end{bmatrix} = \begin{bmatrix} u_{I,MS,k-1} \\ u_{II,MS,k-1} \end{bmatrix}.$$

p represents the iteration step in equation 10. To determine the stability and convergence speed of the fixed-point iteration, it is useful to identify the spectral radius p as the stability parameter S (equation 11):

$$\rho = \max\{|eig(J)|\},$$

$$J = \begin{bmatrix} 0 & D_{dII,MS,MS}^{(\beta)} \\ D_{dI,MS,MS}^{(\alpha)} & 0 \end{bmatrix}.$$

The eigenvalues of the matrix J resulting from the coupling equation system 11 can also be subjected to a different suitable evaluation.

In another embodiment of the method 1, additional dead times are included in the coupling equations of the coupling equation system 11 to avoid implicit couplings. Then, the coupling equation system 11 from equation 8 becomes the following equation 12:

$$\begin{bmatrix} u_{I,MS,k} \\ u_{II,MS,k} \end{bmatrix} = \begin{bmatrix} w_{II,k} \\ w_{I,k} \end{bmatrix} + \begin{bmatrix} 0 & D^{(\beta)}_{dII,MS,MS} \\ D^{(\alpha)}_{dI,MS,MS} & 0 \end{bmatrix} \begin{bmatrix} u_{I,MS,k-1} \\ u_{II,MS,k-1} \end{bmatrix}.$$

On the right side of equation 8, the coupling variables $u_{I,MS,k}$, $u_{II,MS,k}$ at point k have been replaced by the coupling variables at point k−1, i.e., $u_{I,MS,k-1}$ and $u_{II,MS,k-1}$. The resulting equation 12 thus becomes a pure determination equation for the coupling variables at point k, because the coupling variables at point k−1 are known; the complex implicit numerical solution is therefore no longer necessary. The dead times are provided here at the separation points, i.e., at the branch circuits of the overall circuit 2 that were separated in the separation step 100. At the separation points, the coupling variables are delayed by one calculation step, which is easy to do in the time-discrete formulation of the state space representations. As explained in the general descriptive part, this measure may have an actual physical correspondent as well, i.e., the transmission time for the coupling variables from a computing unit to another computing unit. The following applies then, for example (equation 13; compare with the formulation in equation 5):

$$u_{II,MS,k} = y_{I,MS,k-1} \text{ and } u_{I,MS,k} = y_{II,MS,k-1}.$$

If the advantage of the transition of the coupling equation system 11 from an implicit mathematical context to an explicit mathematical context is to be maintained, but the effect of the additional dead time is to be avoided but at least weakened when merely replacing $u_{I,MS,k}$, $u_{II,MS,k}$ at point k by $u_{I,MS,k-1}$ and $u_{II,MS,k-1}$ at point k−1, then $u_{I,MS,k}$, $u_{II,MS,k}$ is replaced by reasonable estimates based on old values of the coupling variables. One embodiment provides that the coupling variables are calculated in a calculation step k by extrapolating several previous values of these coupling variables in past calculation steps (k−1, k−2, . . . ). In a simple case, the extrapolation of a linear continuation of the previous two values of the coupling variables at points k−1 and k−2. In a further development of this method, the described extrapolation is suspended, if switching events occur in an overall electrical circuit, because then the flows and voltages can change very quickly. The (linear) continuation of the coupling values can then deviate significantly from the actual course of the coupling values so that, in this case, for one or a few calculation steps, the implicit coupling equation system is calculated with an implicit numerical method.

It only makes sense that additional state equations are created by this measure, so that an expanded formulation of the substate space representations 6a, 6b results, i.e., equation 14 for the first subcircuit 5a $$\begin{bmatrix} x_{I,k+1} \\ y_{I,MS,k} \end{bmatrix} = \begin{bmatrix} \Phi^{(\alpha)}_I & 0 \\ C^{(\alpha)}_{dI,MS} & 0 \end{bmatrix}$$

$$\begin{bmatrix} x_{I,k} \\ y_{I,MS,k-1} \end{bmatrix} + \begin{bmatrix} H^{(\alpha)}_{I,u} \\ D^{(\alpha)}_{dI,MS,u} \end{bmatrix} u_{I,int,k} + \begin{bmatrix} H^{(\alpha)}_{I,MS} \\ D^{(\alpha)}_{dI,MS,MS} \end{bmatrix} u_{I,MS,k},$$

$$\begin{bmatrix} y_{I,m,k} \\ y_{I,MS,k-1} \end{bmatrix} = \begin{bmatrix} C^{(\alpha)}_{dI,m} & 0 \\ 0 & I \end{bmatrix} \begin{bmatrix} x_{I,k} \\ y_{I,MS,k-1} \end{bmatrix} + \begin{bmatrix} D^{(\alpha)}_{dI,m,u} \\ 0 \end{bmatrix} u_{I,int,k} + \begin{bmatrix} D^{(\alpha)}_{dI,m,MS} \\ 0 \end{bmatrix} u_{I,MS,k},$$

and equation 15 for the second subcircuit 5b $$\begin{bmatrix} x_{II,k+1} \\ y_{II,MS,k} \end{bmatrix} = \begin{bmatrix} \Phi^{(\beta)}_{II} & 0 \\ C^{(\beta)}_{dII,MS} & 0 \end{bmatrix}$$

$$\begin{bmatrix} x_{II,k} \\ y_{II,MS,k-1} \end{bmatrix} + \begin{bmatrix} H^{(\beta)}_{II,u} \\ D^{(\beta)}_{dII,MS,u} \end{bmatrix} u_{II,int,k} + \begin{bmatrix} H^{(\beta)}_{II,MS} \\ D^{(\beta)}_{dII,MS,MS} \end{bmatrix} u_{II,MS,k},$$

$$\begin{bmatrix} y_{II,m,k} \\ y_{II,MS,k-1} \end{bmatrix} = \begin{bmatrix} C^{(\beta)}_{dII,m} & 0 \\ 0 & I \end{bmatrix}$$

$$\begin{bmatrix} x_{II,k} \\ y_{II,MS,k-1} \end{bmatrix} + \begin{bmatrix} D^{(\beta)}_{dII,m,u} \\ 0 \end{bmatrix} u_{II,int,k} + \begin{bmatrix} D^{(\beta)}_{dII,m,MS} \\ 0 \end{bmatrix} u_{II,MS,k}.$$

A composite overall state space representation (not to be mistaken for the non-composite overall state space representation 4) is formed from the substate space representations 6a, 6b (equations 14 and 15), and the eigenvalues of the composite overall state space representation are determined as stability parameters S. The composite overall state space representation then looks like this (equation 16):

$$\begin{bmatrix} x_{I,k+1} \\ x_{II,k+1} \\ y_{I,MS,k} \\ y_{II,MS,k} \end{bmatrix} = \underbrace{\begin{bmatrix} \Phi^{(\alpha)}_I & 0 & 0 & H^{(\alpha)}_{I,MS} \\ 0 & \Phi^{(\beta)}_{II} & H^{(\beta)}_{II,MS} & 0 \\ C^{(\alpha)}_{dI,MS} & 0 & 0 & D^{(\alpha)}_{dI,MS,MS} \\ 0 & C^{(\beta)}_{dII,MS} & D^{(\beta)}_{dII,MS,MS} & 0 \end{bmatrix}}_{\Phi_G} \begin{bmatrix} x_{I,k} \\ x_{II,k} \\ y_{I,MS,k-1} \\ y_{II,MS,k-1} \end{bmatrix} +$$

$$\underbrace{\begin{bmatrix} H^{(\alpha)}_{I,u} & 0 \\ 0 & H^{(\beta)}_{II,u} \\ D^{(\alpha)}_{dI,MS,u} & 0 \\ 0 & D^{(\beta)}_{dII,MS,u} \end{bmatrix}}_{H_G} \begin{bmatrix} u_{I,int,k} \\ u_{II,int,k} \end{bmatrix}.$$

The determined eigenvalues of the composite overall state space representation can be used as the stability parameter S. A special embodiment of the method 1 provides additionally that the eigenvalues of the non-composite overall state space representation 4 of the non-separated overall circuit 2 are determined and a total distance measure ε of the minimum eigenvalue differences between the eigenvalues of the composite overall state space representation and the non-composite overall state space representation 4 is calculated as a summary stability parameter S (equation 17):

$$\varepsilon = \sum_{\alpha,\beta} \sum_{j=1}^{m} \min_i \{|\tilde{\lambda}_j - \overline{\lambda}_i|\},$$

$$\overline{\lambda}_i = \begin{cases} \lambda_i & 0 < i \le n \\ 0, & n < i \le m \end{cases}.$$

Figure 7:
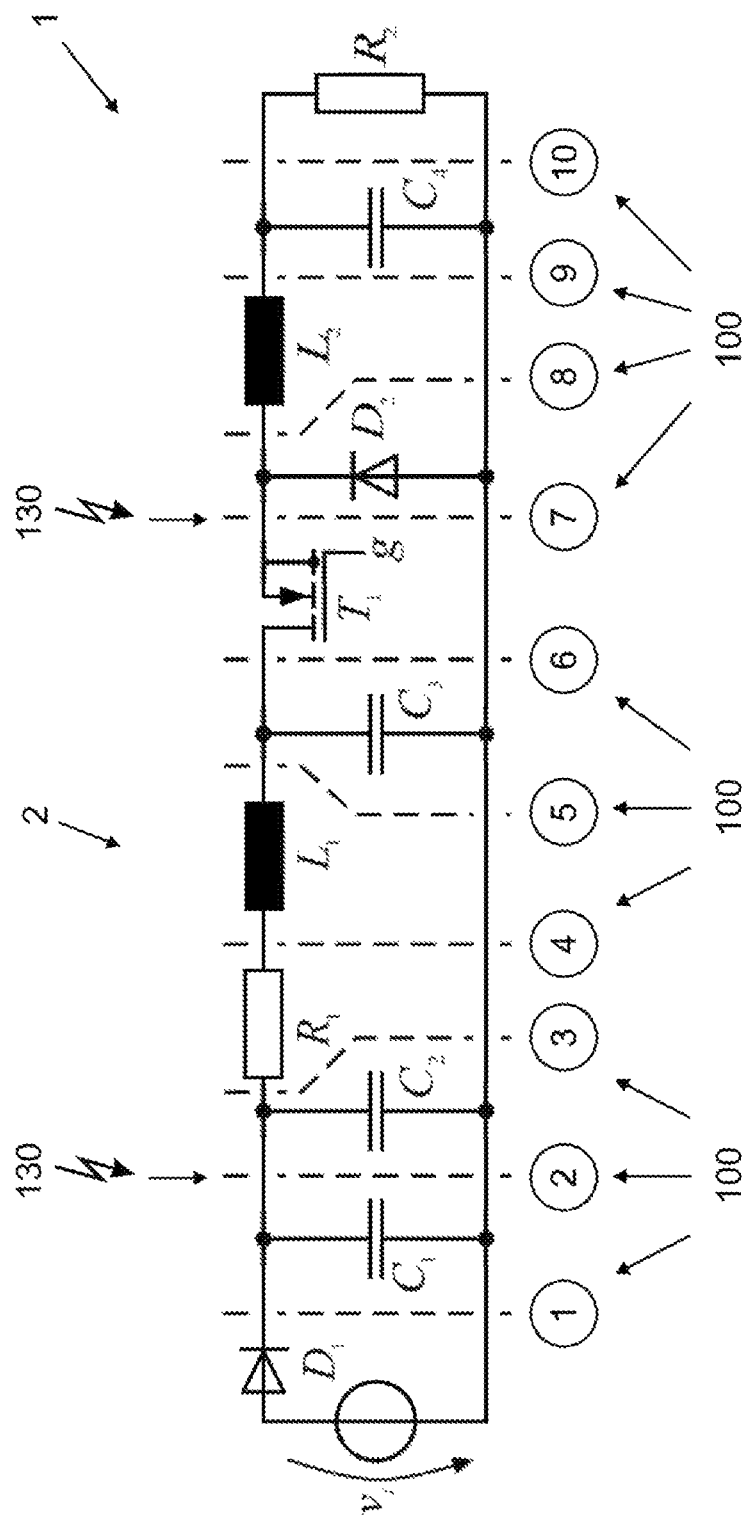
FIG. 7 shows an overall circuit with different possible separation points.
Figure 8:
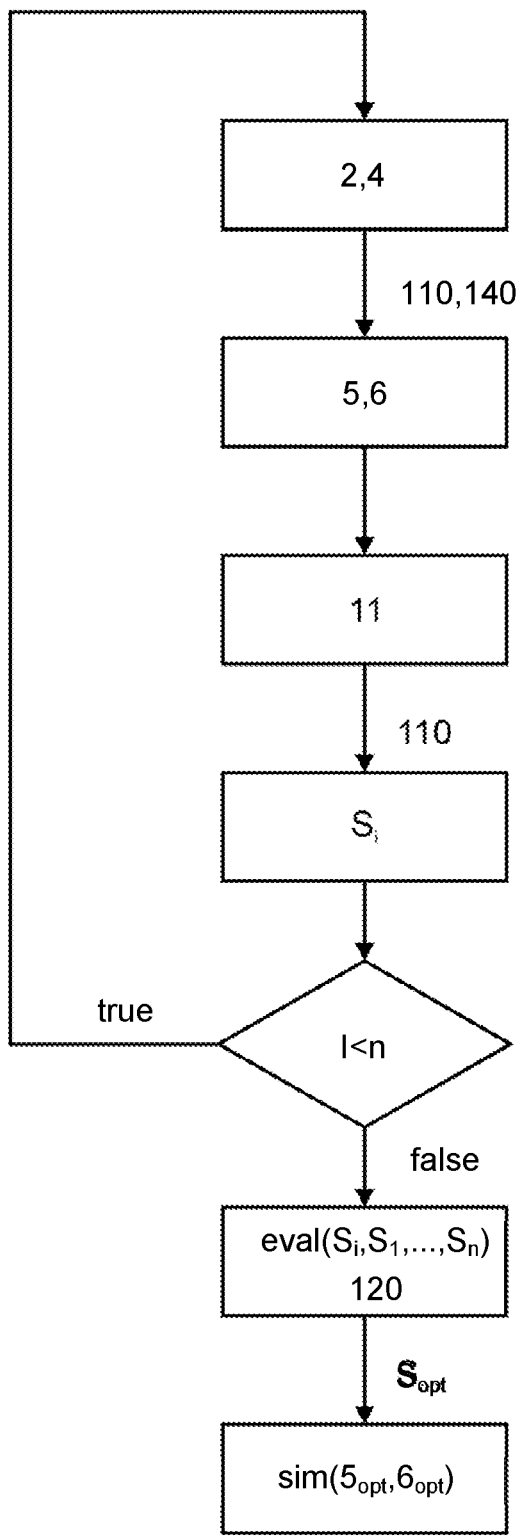
FIG. 8 shows a flow chart similar to FIG. 6 with the determination of a plurality of stability parameters.

FIG. 7 shows that the overall circuit 2 is separated into several different subcircuit variations from two subcircuits in several separation steps 100. The underlying method is illustrated in FIG. 8. For each of the different subcircuit variations that are based on a different separation step 100, at least one stability parameter is then calculated in a separate evaluation step 110, so that a plurality of stability parameters $S_i$, $S_1$, $S_2$, $S_n$ results. In the selection step 120, depending on the plurality of the calculated stability parameters $S_i$, the best stability parameter $S_{opt}$ is determined, here by comparing the plurality of calculated stability parameters $S_i$, which means that the best suitable subcircuits $5_{opt}$ and the best suitable substate space representations $6_{opt}$ are known as well. On their basis then, a simulation is performed ($Sim(5_{opt}, 6_{opt})$).

FIG. 7 shows as well that the directly dependent state values of the overall circuit 2 and therefore the linear dependent circuit components are determined in a detection step 130 to detect dependent circuit components in the overall circuit 2. In the shown overall circuit 2, the parallel switched capacitors Ci and Ca are dependent from one another or, respectively, share the terminal voltage. In this case, the branch circuits between the dependent circuit components Ci, Ca are excluded as possible separation sites of the overall circuit 2 in a separation exclusion step, cf. FIG. 8, whereby in the subsequent separation step 100 the branch circuits are excluded that were excluded in the separation exclusion step 140 as possible separation sites of the overall circuit 2.

In this context, FIG. 7 also shows that dependent switch groups are determined in the detection step 130 for the detection of dependent circuit components in the overall circuit 2, i.e., those switches D, T, that directly influence one another. In the illustrated circuit example, these are the MOSFET $T_1$ and the diode $D_2$. In the subsequent separation exclusion step 140, the branch circuits between the dependent switches are, as before, excluded as sites of a possible separation of the overall circuit 2.

Figure 9:
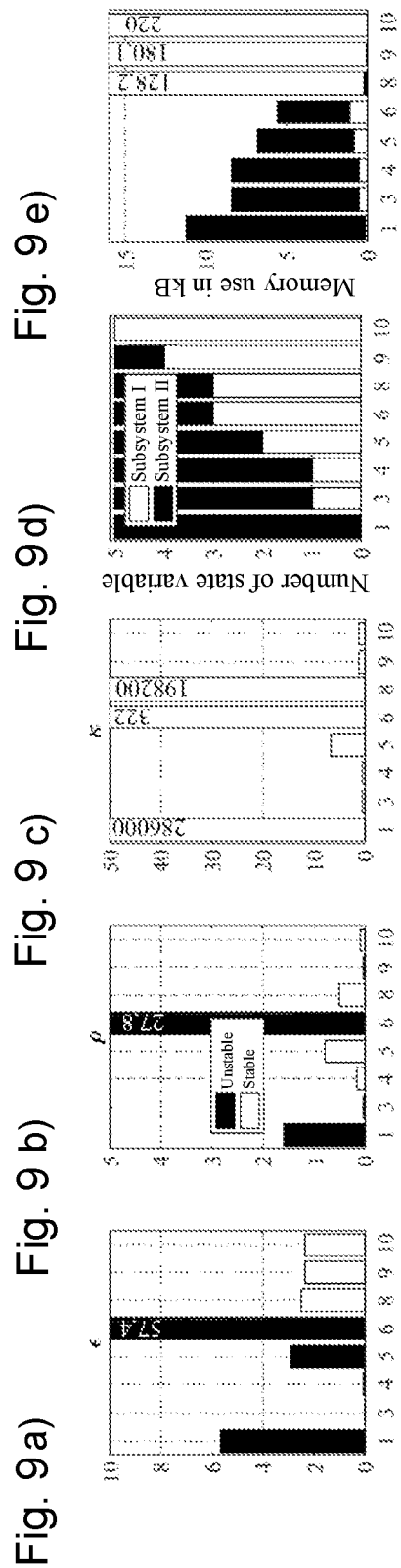
FIGS. 9a-9e show an analysis of the different separation points according to FIG. 7 with regard to stability, state distribution, and memory requirement.

FIG. 9 shows the evaluation of the different separations of the overall circuit 2 from FIG. 7. The x-coordinate of the five diagrams 9a) to 9e) shows the separation points, with the numbering in FIG. 9 corresponding to the separation point numbering in FIG. 7. What is noteworthy is that the separation points 2 and 7 that are excluded in the separation exclusion step 140 are not listed at all in the evaluation in FIG. 9, because the overall circuit 2 was not separated at these sites.

FIGS. 9a) to 9c) show evaluations that are based on different stability parameters S, that were explained above, i.e., on the basis on the total distance measure c (when adding additional dead times, FPGA-capable, smallest total distance is best) of the minimum eigenvalue differences between the eigenvalues of the composite total state space representation and the non-composite total state space representation, on the basis of the spectral radius ρ (fixed-point iteration, FPGA-capable, stability at values less than 1), and on the basis of the condition number κ (numeric direct solution with divisions, values greater or equal to 1, smaller values in well-conditioned matrices). Furthermore, FIG. 9d) illustrates the distribution of the state variables on the subcircuits and FIG. 9e) the memory used in each subcircuit.

The evaluation shows that separation 1 is completely unsuitable for stability reasons and due to the poor conditioning. The separations 3 and 4 have equally outstanding stabilities for all methods. Due to the easy calculation, preference is given to the dead times variation. Separation 5 is only recommendable when using the direct method; at the same time, the distribution of the state variables and the use of storage is evenly distributed. Separation 6 has a balanced state variable and memory distribution, but stability only exists for the direct method, and the condition is only adequate here as well. Separations 8, 9, and 10 are stable, but all switches are located in the left subcircuit, which leads to an undesired need for memory, and are therefore not acceptable.

Another approach is described below with the help of which the effort needed to calculate the overall circuit 2 or the coupled substate space representations 6a, 6b with the coupling equation system 11 is reduced. The approach is based on the idea that the overall circuit 2 is first separated at a position where no direct punch-through of the resulting coupling values exists or, respectively, is created by the separation. In the mathematically continuous case, this means that the punch-through matrix D of the subcircuits 5a, 5b is zero or, respectively, that the elements of the D matrix get to zero. Then, the state space representations of the subcircuits 5a, 5b are divided into an internal part without coupling values, i.e., only with internal state values and, if applicable, external inputs, which have nothing to do with the coupling values, however, and a coupling part with the coupling values as input values. The coupling part is then discretized with an explicit numerical method, because only in this case is it guaranteed that the discrete punch-through matrix $D_d$ of the discrete substate space representations 6a, 6b or, respectively, the elements of the $D_d$ matrix remain zero as well. The internal part is discretized and calculated with an implicit numerical method.

In the separation step 100, branch circuits are selected as the site of the separation of the overall circuit 2 that lead to a continuous coupling equation system in an explicit mathematical form, i.e., in which no punch-through exists between the coupling variables of the subcircuits 5a, 5b. This is only the case when the coupling variables of the subcircuits 5a, 5b depend only on the non-biproper state values of the respective subcircuit 5a, 5b, for example on flows in coils and/or of voltages on capacitors. An example of this is shown in FIG. 10. The separations into subcircuits 5a and 5b shown in FIGS. 10a and 10b lead to the desired simplified contexts without a direct cut-through. The clouds represent any type of remaining circuit. In both cases, the voltages on the capacitors Ci and the flows through the coils Li are state values so that in the time-continuous state room description, the cut-through matrixes are zero. As already mentioned, this characteristic is maintained in the time-discrete description as well when performing the discretization with an explicit method.

Below, it is shown that the substate space representations with the internal state values of the subcircuits 5a, 5b are solved with a combination of an explicit and an implicit numerical method.

In the time-continuous case, the state space description of a subcircuit 5a, 5b, here indicated by the Index I, looks like this (equation 18):

$$\dot{x}_I = A_I^{(\alpha)} x_I + \begin{bmatrix} B_{I,u}^{(\alpha)} & B_{I,MS}^{(\alpha)} \end{bmatrix} \begin{bmatrix} u_{I,int} \\ u_{I,MS} \end{bmatrix}$$
$$= A_I^{(\alpha)} x_I + B_{I,u}^{(\alpha)} u_{I,int} + B_{I,MS}^{(\alpha)} u_{I,MS}$$

For the first two terms $A_I^{(\alpha)} x_I + B_{I,u}^{(\alpha)} u_{I,int}$ the internal part is the substate space representation without coupling values, the remaining term $B_{I,MS}^{(\alpha)} u_{I,MS}$ is the coupled part of the substate space representation with the coupling values created by the circuit separation as the input values (index MS for "model splitting"), i.e.:

$$\dot{x}_I = \underbrace{A_I^{(\alpha)} x_I + B_{I,u}^{(\alpha)} u_{I,int}}_{\dot{x}_{I,int}} + \underbrace{B_{I,MS}^{(\alpha)} u_{I,MS}}_{\dot{x}_{I,MS}}$$

For the internal part and for the coupled part of the time-continuous substate space representation, various discretization methods are now used, i.e., for the internal part an implicit discretization method (e.g., a backward Euler method) and for the coupled part an explicit discretization method (e.g., a forward Euler method). In that case, the time-discrete representation looks like this (equation 19):

$$x_{I,k+1} = x_{I,k} + T \cdot \left( \gamma \cdot \dot{x}_{I,int} \big|_{t_{k+1}} + (1-\gamma) \cdot \dot{x}_{I,int} \big|_{t_k} + \dot{x}_{I,MS} \big|_{t_k} \right)$$

Here, T is the calculation step size and, by selecting a value for $\gamma$, the respective discretization method can be configured (for $\gamma=0$, $\gamma=1/2$ and $\gamma=1$ forward Euler, Tustin and backward Euler). With the substitution (equation 20):

$$v_{I,k+1} = x_{I,k+1} - \gamma T A_I^{(\alpha)} x_{I,k+1} - \gamma T B_{I,u}^{(\alpha)} u_{I,int,k+1}$$

the following time-discrete substate space representation can be derived (equation 21):

$$v_{I,k+1} = \left(I + (1-\gamma) \cdot A_I^{(\alpha)}\right) \cdot \left(I - \gamma T \cdot A_I^{(\alpha)}\right)^{-1} \cdot$$
$$v_{I,k} + \left[ \left( \gamma T \cdot \left(I + (1-\gamma) \cdot A_I^{(\alpha)}\right) \cdot \left(I - \gamma T \cdot A_I^{(\alpha)}\right)^{-1} + (1-\gamma) \cdot I \right) \cdot B_{I,u}^{(\alpha)} \right.$$
$$\left. T \cdot B_{I,MS}^{(\alpha)} \right] \begin{bmatrix} u_{I,int,k} \\ u_{I,MS,k} \end{bmatrix}$$

That means the following for the outputs (equation 22):

$$\begin{bmatrix} y_{I,m,k} \\ y_{I,MS,k} \end{bmatrix} = C_I^{(\alpha)} \left( I - \gamma T \cdot A_I^{(\alpha)} \right)^{-1} \cdot$$
$$v_{I,k} + \left[ \gamma T \cdot C_I^{(\alpha)} \cdot \left( I - \gamma T \cdot A_I^{(\alpha)} \right)^{-1} \cdot B_{I,u}^{(\alpha)} + D_{I,int}^{(\alpha)} \big| D_{I,MS}^{(\alpha)} \right] \cdot \begin{bmatrix} u_{I,int,k} \\ u_{I,MS,k} \end{bmatrix}$$

The elements of the cut-through matrix in the time-continuous representation are maintained in the time-discrete formulation as well. When these elements become zero due to the skillful separation of the overall circuit into subcircuits shown above, they are zero in the time-discrete representation as well, which makes the calculation much easier.

The method 1 according to an embodiment of the invention permits an evaluation of the separation of an overall circuit into subcircuits through the calculation of a stability parameter on the basis of a coupling equation system without having to simulate subcircuits. The method is fast and reliable and does not have the imponderables of the known simulation method used to estimate stability.

The various criteria of the separation exclusion step 140 to exclude possible separation places on the overall circuit 2 allow for the reliable extraction of meaningful separation points without requiring expertise and experience. All method steps are fully automatable and help find and execute an optimum separation of an overall circuit into subcircuits in a short amount of time with guaranteed stable simulation results and, if applicable, an optimally distributed memory and computing need.

$$x_{I,k+1} = x_{I,k} + T \cdot \left( \gamma \cdot \dot{x}_{I,int} \big|_{t_{k+1}} + (1-\gamma) \cdot \dot{x}_{I,int} \big|_{t_k} + \dot{x}_{I,MS} \big|_{t_k} \right)$$

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Method
2 Electrical circuit
3 Computing unit
4 Overall state space representation
5a, 5b Subcircuits
6a, 6b Substate space representations
7 Simulator
8 I/O interface simulator
9 Controller
10 I/O controller interface
11 Coupling equation system
100 Separation step
110 Evaluation step
120 Selection step
130 Detection step
140 Separation exclusion step

The invention claimed is:

1. A computer-implemented method for real-time simulation of an electrical circuit by at least one field-programmable gate array (FPGA), wherein the electrical circuit includes circuit components and corresponds to an overall state space representation, wherein the electrical circuit is divisible into at least two subcircuits in a separation step that includes separation of branch circuits, wherein each subcircuit corresponds to a substrate space representation, wherein the substrate space representations are coupled with one another through coupling variables of the separated branch circuits, and wherein each subcircuit is calculated by solving coupled substrate space representations on the at least one FPGA, the method comprising:

mapping a coupling of the substrate space representations in a coupling equation system for exchange of calculated coupling variables between the subcircuits;

determining a plurality of different separations of the electrical circuit into subcircuits corresponding to a plurality of different subcircuit variations;

determining, in an evaluation step, at least one stability parameter for each of the plurality of different separations based on the coupling equation system, wherein eigenvalues of composite overall state space representations corresponding to the plurality of different separations are determined as stability parameters;

determining distances of the eigenvalues of the composite overall state space representations to eigenvalues of a non-composite overall state space representation of the electrical circuit without separation;

selecting, in a selection step and based on the stability parameters, a separation out of the plurality of separations having a minimum eigenvalue distance relative to the eigenvalues of the non-composite overall state space representation; and performing, after the selection step and based on the selected separation, the real-time simulation of the electrical circuit by calculating the substrate space representations of the selected separation on the at least one FPGA, wherein the at least one FPGA is part of a controller or a hardware-in-the-loop (HIL) simulator having an I/O interface, and wherein performing the real-time simulation of the electrical circuit comprises:

emitting output values based on the real-time simulation to a technical-physical process via the I/O interface for rapid control prototyping (RCP) or HIL simulation with respect to the technical-physical process, wherein the technical-physical process involves an electric motor, a power grid, an automation machine part, a motor vehicle, an aircraft, an energy generation plant, or an energy distribution plant; and receiving process values from the technical-physical process via the I/O interface.

2. The method according to claim 1, wherein, by inserting at least one dead time in the coupling equation system, the coupling equation system transitions the coupling equation system from an implicit context to an explicit context between the coupling variables.

3. The method according to claim 1, wherein a coupling variable is calculated in a calculation step k by extrapolation of several previous values of the coupling variable in previous calculation steps (k−1, k−2, . . . ).

4. The method according to claim 2, wherein a coupling equation of the coupling equation system is expanded by the at least one dead time.

5. The method according to claim 1, wherein in a detection step for detection of dependent circuit components in the electrical circuit, directly dependent state values of the electrical circuit and linear dependent circuit components are determined, wherein in a separation exclusion step branch circuits between the dependent circuit components are determined to be excluded as possible separation sites for the electrical circuit, and wherein in the separation step the branch circuits between the dependent circuit components that were determined in the separation exclusion step are excluded as possible separation sites for the electrical circuit.

6. The method according to claim 5, wherein dependent switch groups are determined in the detection step, and wherein in the separation exclusion step the branch circuits between dependent switches of the dependent switch groups are excluded as possible separation sites for the electrical circuit.

7. The method according to claim 1, wherein, in the separation step, branch circuits are selected as sites of separation for the electrical circuit to lead to the coupling equation system having an explicit form.

8. The method according to claim 7, wherein the coupling variables of the subcircuits only depend on non-biproper state values of a corresponding subcircuit.

9. The method according to claim 7, wherein substrate space representations with internal state values of the subcircuits are solved with a combination of an explicit numerical method and an implicit numerical method.

10. The method according to claim 1, wherein the at least one stability parameter is calculated for several combinations of switch settings.

11. The method according to claim 1, wherein in the separation step selection of the branch circuits of the electrical circuit is performed depending on at least one of: whether resulting subcircuits have approximately a same number of energy storage systems with respect to coils and capacitors; or whether the resulting subcircuits have approximately a same number of switches.

12. The method according to claim 1, wherein a spectral radius of the coupling equation system is determined.

13. The method according to claim 6, wherein the dependent switch groups include switches that directly influence one another.

14. The method according to claim 7, wherein no cut-through exists between the coupling variables of the subcircuits.

15. The method according to claim 11, wherein a limit is provided for at least one of:
an acceptable deviation from an equal number of energy storage systems;
an acceptable deviation from an equal number of switches;
an acceptable deviation from an equal number of inputs; or
an acceptable deviation from an equal number of outputs.

* * * * *